United States Patent Office 2,921,218
Patented Jan. 12, 1960

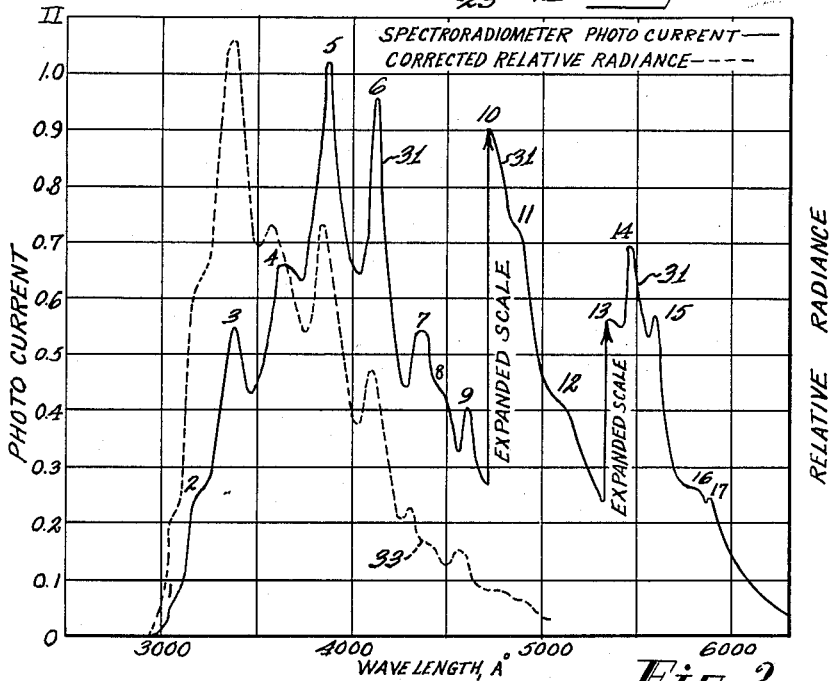
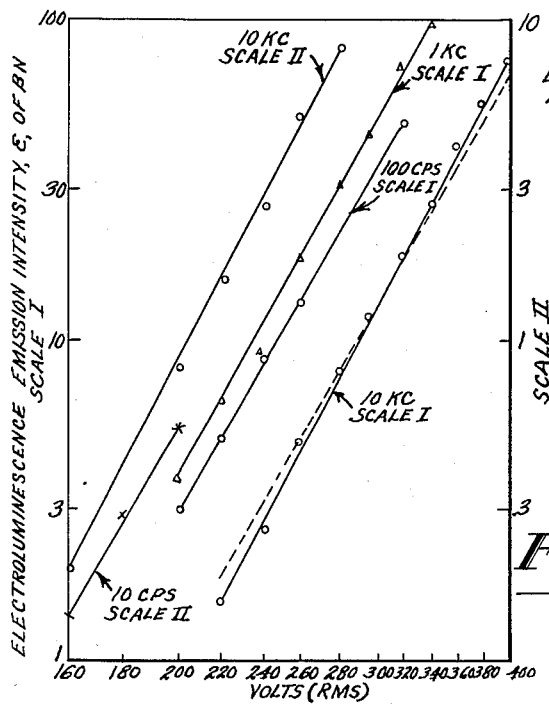
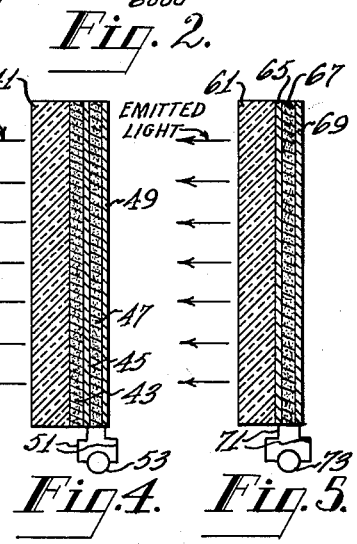

2,921,218

ELECTROLUMINESCENT DEVICES

Simon Larach, Jersey City, and Ross E. Shrader, Princeton, N.J., assignors to Radio Corporation of America, a corporation of Delaware Application March 1, 1956, Serial No. 568,893

9 Claims. (Cl. 313—108)

This invention relates to improved electroluminescent devices and particularly to improved electroluminescent devices capable of emitting in the ultraviolet and including boron nitride as the active ultraviolet-emitting electroluminescent material.

An electroluminescent material is a material which emits light when an electric field of sufficient magnitude is applied to it. Previously reported electroluminescent materials emit principally in the visible and infrared regions of the spectrum. A simple electroluminescent device comprises a body including an electroluminescent material and means for applying an electric field thereto.

An object of the invention is to provide improved electroluminescent devices.

Pure boron nitride, a previously known compound, has been found to possess the unusual and unexpected property of emitting ultraviolet light when an alternating electric field is applied thereto. A preferred arrangement for producing ultraviolet emission comprises generally a layer of a dielectric medium having dispersed therein finely-divided boron nitride particles and means, such as a pair of electrodes on opposite surfaces of said layer, for applying an alternating electric field thereto. The invention involves the use of an electroluminescent layer consisting essentially of boron nitride, that is, a layer in which the active electroluminescent material consists of boron nitride, and which may include a dielectric binder. Other embodiments of devices include boron nitride in combination with a photoluminescent ultraviolet-excitable phosphor and means for applying an electric field to the boron nitride. In such arrangements the electroluminescence emission from the boron nitride excites the photoluminescent material, which in turn emits light of a desired color depending upon the characteristic of the photoluminescent material. Such arrangements may comprise layered structures wherein the boron nitride and the photoluminescent phosphor are in the same or separate layers.

The invention will be described in greater detail by reference to the accompanying drawings in which:

Figure 1 is a partially-schematic, sectional view of an apparatus for obtaining electroluminescence emission from boron nitride.

Figure 2 is a graph illustrating the relative spectral distribution of the electroluminescence emission from boron nitride.

Figure 3 is a family of curves illustrating the voltage dependence of electroluminescence emission from boron nitride.

Figure 4 is a partially-schematic, sectional view of a first device including boron nitride and a photoluminescent material.

Figure 5 is a partially-schematic, sectional view of a second device including boron nitride and a photoluminescent material.

Boron nitride may be prepared by heating borax with ammonium chloride to white heat. It may also be prepared by heating boron in nitrogen or ammonia gas to white heat. Boron nitride is a white refractory solid which sublimes below 3000° C. and is inert at elevated temperatures to oxygen, hydrogen and iodine.

Electroluminescent cells may be prepared by depositing a slurry made up of a finely-divided boron nitride suspended in a dielectric medium, such as castor oil, between a pair of electrodes, one of which is transparent to the electroluminescence emission from the boron nitride. Referring to Figure 1, a suitable cell for observing electroluminescence is prepared by first suspending powdered boron nitride in castor oil in the proportion of one gram of boron nitride to two grams of castor oil. A small amount 21 of this suspension was placed between an opaque aluminum electrode 23 and a transparent electrode 27. The transparent electrode 27 may be prepared by exposing the surface of a heated sheet of quartz to the vapors of tin chloride and afterwards exposing to a slightly reducing atmosphere. An electrically-conducting coating 25, sometimes referred to as a NESA coating, is formed thereby which appears to contain stannic oxide probably to some extent at least reduced to a form lower than the dioxide, although the exact composition is not fully known. The electrodes 23 and 25 are so arranged to provide therebetween a stable gap 0.002 inch wide. Each of the electrodes 23 and 25 is coupled by leads 29 to a voltage source (not shown) which provides sinusoidal alternating voltage with harmonic frequencies up to 50 kc. and a peak to peak voltage up to 1200 volts.

Referring to Figure 2, the spectral distribution curve of the electroluminescence emission from boron nitride is shown by the solid line curve 31. This curve is the photocurrent reading for each wavelength as indicated in a spectroradiometer. The dotted line curve 33 is the corrected relative radiance from the solid line curve. The emission of the test cell is shown to consist of a broad band upon which is superimposed many narrow bands numbered from 1 to 17. Although the relative intensity of the fine structure differs somewhat with the type of excitation, the position of the bands is essentially invariant with the mode of excitation and temperature. The emission extends from about 2950 A. to about 6500 A. The principal emission is in the ultraviolet region of the spectrum. The curves of Figure 2 were taken from a cell described in Figure 1 having 30 kilocycles and 1000 volts applied to the electrodes.

Referring to Figure 3, the electroluminescence emission intensity of boron nitride is plotted as a function of the applied voltage. It is seen that for frequencies up to one kilocycle, the emission intensity varies as the 6.5 power of the voltage. For 10 kilocycles, the power of the variation brightness of voltage is even higher. Generally, the higher the frequency and the higher the voltage applied, the greater the light output. In the cell of Figure 1, electroluminescence is obtained with frequencies at least between 10 cycles and 1 megacycle and with voltages at least between 10 and 2000 volts.

The above described cell is generally satisfactory for test purposes. A more permanent cell comprises a transparent base, such as a sheet of glass, a transparent electrically-conducting layer thereon such as glass treated with tin chloride as hereinbefore described, an electroluminescent layer thereon made from finely-divided boron nitride dispersed in a solid or semi-solid dielectric medium of reasonable light-transmitting properties, and a metallic coating thereon such as aluminum. Suitable light-transmitting media are waxes such as paraffin and carnauba wax; synthetic resins such as silicone, araldite, and polystyrene; natural resins such as shellac; and special types of glass. The metallic coating and the transparent electrically-conducting coating are connected to a suitable A.C. voltage source. Upon applying an A.C. voltage, light may be observed through the transparent base.

Another arrangement includes boron nitride in combination with a photoluminescent material. A typical device includes boron nitride, means for exciting boron nitride to electroluminescence, and a photoluminescent material so arranged to be excited by the electroluminescence emission from the boron nitride and which will re-emit light of another frequency. Referring to Figure 4, a cell is shown in the form of a layered structure. The cell comprises, in the order named, a transparent support member 41, such as glass or mica, a layer of photoluminescent material 43, a non-reactive transparent first electrically-conducting layer 45, which may be a minutely thin metallic coating such as aluminum or silver, a layer consisting essentially of finely-divided boron nitride 47 and a second electrically-conducting layer 49 which is preferably a good light reflector such as aluminum. In place of the transparent first electrically-conducting coating 45, a thin sheet of glass or mica may be used having a surface layer nearest the boron nitride layer 47 rendered electrically-conducting by treatment with tin chloride. The second electrically-conducting layer 49 may also be a sheet of glass or mica whose surface in contact with the boron nitride layer 47 has been treated to render it electrically-conducting by treatment with tin chloride.

A voltage source 53 of alternating current is connected across the electrically-conducting layers 45 and 49 through leads 51 to produce an electric field across the boron nitride layer 47. Such electric field causes an ultraviolet electroluminescence emission from the boron nitride layer 47 which emission passes through the transparent first electrically-conducting layer 45, exciting the photoluminescent material in the photoluminescent layer 43.

The photoluminescent layer 43 when excited gives off its characteristic colored light, which colored light passes through the transparent support member 41. The active material of the photoluminescent layer 43 may be any ultraviolet excitable phosphor. Characteristic emissions of some suitable phosphors are as follows:

*White light.*—Calcium halophosphate with antimony activator or a mixture of zinc beryllium silicate with about 1.0% manganese activator and magnesium tungstate

*Red light.*—Zinc cadmium sulfide with 0.01% silver activator, zinc cadmium sulfide with 0.01% copper activator, zinc sulphoselenide with 1.0% of an activator selected from the group consisting of silver, copper and gold, and zinc selenide with 0.01% copper activator

*Blue light.*—Cubic zinc sulfide with 0.01% silver activator, hexagonal zinc sulfide with 0.1% copper activator

*Green light.*—Zinc sulfide with 0.01% copper activator, zinc cadmium sulfide with 0.01% copper activator, zinc oxide, zinc germanate with 1.0% manganese activator

*Yellow light.*—Zinc sulfide with 1.0% manganese activator.

Referring to Figure 5, the separate electroluminescent and photoluminescent layers of Figure 4 may be combined into a single layer 67 which consists essentially of finely-divided boron nitride and a finely-divided ultraviolet stimulable photoluminescent material. The device comprises a layered structure including a transparent support member 61, a transparent electrically-conducting coating 65 thereon, a luminescent layer 67 and an electrically-conducting layer 69 which is preferably a good light reflector. A source of A.C. voltage 73 is connected to the electrodes 65 and 69.

The luminescent layer 67 consists of a mixture of electroluminescent boron nitride and photoluminescent phosphor particles mixed with a suitable dielectric material. Under field excitation from the voltage source, the electroluminescent material emits ultraviolet light which excites the photoluminescent material to emit light which passes through the transparent support.

The devices of Figure 4 and Figure 5 may also be arranged in cylindrical or spherical structures with the transparent support 41 arranged outwardly. In such structures the support 41 or 61 comprises a hollow cylinder or sphere, for example, with the layered structures coated on the inside thereof.

There have been described improved electroluminescent devices and particularly electroluminescent devices including boron nitride which emits ultraviolet electroluminescence upon electric field excitation.

What is claimed is:

1. An electroluminescent device comprising a layer consisting essentially of boron nitride, and electrode means for applying an electric field across said layer for producing ultraviolet light.

2. An electroluminescent device comprising a layer of a dielectric medium having dispersed therein finely-divided boron nitride and electrode means for applying an electric field across said layer for producing electroluminescent light.

3. A device comprising a pair of closely spaced electrodes, a layer of a dielectric medium having dispersed therein finely-divided boron nitride spacing said electrodes, and connection means for a source of voltage attached to said electrodes.

4. A luminescent device including an electroluminescent body consisting essentially of boron nitride, and radiation-permeable electrode means connected to spaced portions of said body for applying an electric field thereto.

5. A luminescent device including a layer of an electroluminescent material consisting essentially of boron nitride, radiation-permeable electrode means for applying an electric field to said layer, and a layer of photoluminescent material positioned to receive electroluminescent emission from said first-named layer.

6. A device as in claim 5, wherein the active material of said photoluminescent material is selected from the group consising of: calcium halophosphate, zinc beryllium silicate and magnesium tungstate, zinc cadmium sulfide with silver activator, zinc cadmium sulfide with copper activator, zinc sulphoselenide with copper activator, zinc selenide with copper activator, cubic zinc sulfide with silver activator, hexagonal zinc sulfide with silver activator, zinc sulfide with copper activator, zinc oxide, zinc germanate with manganese activator, and zinc sulfide and manganese activator.

7. A device comprising an electroluminescent first layer consisting essentially of boron nitride and capable of emitting radiations in response to electric fields applied thereto, and a second layer of a photoluminescent material adjacent to said first layer and capable of emitting radiations in response to said first mentioned radiations, and radiation permeable electrode means for applying an electric field to said first layer.

8. A device comprising a transparent support member, a layer thereon of photoluminescent material, a transparent conductive electrode on said layer, an electroluminescent layer consisting essentially of boron nitride on said electrode, a light-reflecting electrode on the other side of said second-named layer.

9. A device comprising a transparent support member, a transparent conducting coating theron, a luminescent layer on said coating, and a conducting coating on the other side of said luminescent layer, said luminescent layer being composed of two different materials in intimate association, one of said materials being boron nitride and the other being a photoluminescent phosphor which will absorb radiation from said boron nitride produced by an application of a voltage to said coatings and which will emit visible light in response thereto.

References Cited in the file of this patent

UNITED STATES PATENTS

| | | |
|---|---|---|
| 2,494,883 | Kroger | Jan. 17, 1950 |
| 2,566,349 | Mager | Sept. 4, 1951 |
| 2,692,349 | Ouweltjes | Oct. 19, 1954 |
| 2,774,903 | Burns | Dec. 18, 1956 |